US007442669B2

(12) United States Patent
Wickham et al.

(10) Patent No.: US 7,442,669 B2
(45) Date of Patent: Oct. 28, 2008

(54) OXIDATION CATALYSTS COMPRISING METAL EXCHANGED HEXAALUMINATE WHEREIN THE METAL IS SR, PD, LA, AND/OR MN

(75) Inventors: David Wickham, Boulder, CO (US); Ronald Cook, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 143 days.

(21) Appl. No.: 10/382,132

(22) Filed: Mar. 5, 2003

(65) Prior Publication Data

US 2003/0176278 A1 Sep. 18, 2003

Related U.S. Application Data

(60) Provisional application No. 60/362,586, filed on Mar. 5, 2002.

(51) Int. Cl.
*C01F 7/02* (2006.01)
(52) U.S. Cl. .................................. 502/303; 502/328
(58) Field of Classification Search .................. 502/303, 502/304, 324, 328
See application file for complete search history.

(56) References Cited

U.S. PATENT DOCUMENTS

| 5,823,761 | A | 10/1998 | Euzen et al. | ................ | 431/7 |
|---|---|---|---|---|---|
| 5,830,822 | A | 11/1998 | Euzen | ................ | 502/355 |
| 5,899,679 | A | 5/1999 | Euzen et al. | ................ | 431/7 |
| 6,207,130 | B1 | 3/2001 | Kareiva et al. | ................ | 423/600 |
| 6,322,890 | B1 * | 11/2001 | Barron et al. | ................ | 428/402 |
| 6,413,489 | B1 | 7/2002 | Ying et al. | ................ | 423/600 |

FOREIGN PATENT DOCUMENTS

| JP | 1-210031 | * | 8/1989 |
|---|---|---|---|
| WO | WO 99/15534 | * | 4/1999 |

OTHER PUBLICATIONS

Sidwell, et al., "Catalytic combustion of premixed methane/air on a palladium-substituted hexaaluminate stagnation surface", Proceedings of the Combustion Institute, 29(Pt. 1), pp. 1013-1020, 2002.*
Translation of Japan 1-210031, Aug. 1989, pp. 1-25.*
Arai and Machida (1991). "Recent Progress in High-Temperature Catalytic Combustion", *Catalysis Today*, 10, pp. 81-94.
Arai and Machida (1996). "Thermal Stabilization of Catalyst Supports and their Application to High-Temperature Catalytic Combustion", *Applied Catalysis*, 138, pp. 161-176.
Armor, J.N. (1992). "Environmental Catalysis," *Applied Cat. B: Environmental*, 1, p. 221-256.
Artizzu, P., et al. (1999). "Catalytic Combustion of Methane on Aluminate-Supported Copper Oxide", *Catalysis Today*, 47, pp. 83-93.
Artizzu-Duart, P., et al. (2000). "Catalytic Combustion of Methane on Substituted Barium Hexaaluminates", *Catalysis Today*, 59, pp. 163-177.

Batiot-Dupeyrat, C., et al. (Jan. 2001). "Methane Catalytic Combustion on La-based Perovskite Type Catalysts in High Temperature Isothermal Conditions", *Applied Catalysis A: General*, 206, pp. 205-215.
Beebe, K.W., et al. (2000). "Development of Catalytic Combustion Technology for Single-Digit Emissions from Industrial Gas Turbines", *Catalysis Today*, 59, pp. 95-115.
Cinibulk, M. (1995). "Synthesis and Characterization of Sol-gel Derived Lanthanum Hexaaluminate Powders and Films", *J. Mater. Res.*, 10, pp. 71-76.
Dalla Betta, R.A. (1997). "Catalytic Combustion Gas Turbine Systems: the Preferred Technology for Low Emissions Electric Power Production and Co-Generation", *Catalysis Today*, 35, pp. 129-135.
Dalla Betta, R.A. and T. Rostrup-Nielsen (1999). "Application of Catalytic Combustion to a 1.5 MW Industrial Gas Turbine", *Catalysis Today*, 47, pp. 369-375.
Fant, D.B., et al. (2000). "Status of Catalytic Combustion R&D for the Development of Energy Advanced Turbine Systems Program", *Journal of Engineering for Gas Turbines and Power*, 122, pp. 293-300.
Forzatti, P. and G. Groppi (1999). "Catalytic Combustion for the Production of Energy", *Catalysis Today*, 54, pp. 165-180.
Gates, S. (2000). "Industrial Advanced Turbine Systems Program Overview", Presentation at the Advanced Turbine Systems Program Review, Alexandria Va, Dec. 4-6.
Groppi, G., et al. (1993). Preparation and Characterization of Hexaaluminate-based Materials for Catalytic Combustion, *Applied Catalysis A: General*, 104, pp. 101-108.
Groppi, G., et al. (Dec. 2001). "Preparation, Characterization, and Catalytic Activity of Pure and Substituted La-Hexxaluminate Systems for High Temperature Catalytic Combustion", *Applied Catalysis B: Environmental*, 35, pp. 137-148.
Harlan, C.J.A. et al. (1997). "Yttrium Doped Alumoxanes: A *Chemie Douce* Route to $Y_3Al_5O_{12}$ (YAG) and $Y_4Al_2O_9$ (YAM).", *Adv. Mater.* 9(1), 68-71.

(Continued)

*Primary Examiner*—Steven Bos
(74) *Attorney, Agent, or Firm*—Greenlee, Winner and Sullivan P.C.

(57) ABSTRACT

The present invention provides metal-exchanged hexaaluminate catalysts that exhibit good catalytic activity and/or stability at high temperatures for extended periods with retention of activity as combustion catalysts, and more generally as oxidation catalysts, that make them eminently suitable for use in methane combustion, particularly for use in natural gas fired gas turbines. The hexaaluminate catalysts of this invention are of particular interest for methane combustion processes for minimization of the generation of undesired levels (less than about 10 ppm) of NOx species. Metal exchanged hexaaluminate oxidation catalysts are also useful for oxidation of volatile organic compounds (VOC), particularly hydrocarbons. Metal exchanged hexaaluminate oxidation catalysts are further useful for partial oxidation, particularly at high temperatures, of reduced species, particularly hydrocarbons (alkanes and alkenes).

19 Claims, 7 Drawing Sheets

OTHER PUBLICATIONS

Hjalmarsson, A.K. (1990). "Control of Nitrogen Oxide Emissions from Coal Combustion", *International Journal of Energy Research*, 14, pp. 813-882.

Jang, B.W., et al. (1999). "Catalytic Oxidation of Methane over Hexaaluminates and Hexaaluminate-supported Pd Catalysts", *Catalysis Today*, 47, 103-113.

Kareiva, A., et al. (1996). "Carboxylate-Substituted Alumoxanes as Processable Precursors to Transition Metal-Aluminum and Lanthanide-Aluminum Mixed-Metal Oxides: Atomic Scale Mixing Via a New Transmetallation Reaction", *Chemistry of Materials*, 8(9), 2331-2340.

Kikuchi, R., et al. (Sep. 2001). "Thick-Film Coating of Hexaaluminate Catalyst on Ceramic Substrates and its Catalytic Activity for High-Temperature Methane Combustion", *Applied Catalysis A; General*, 218, pp. 101-111.

Macri, G.M. (2000). "ATS Technology Integration at Rolls-Royce", Presentation at the Advanced Turbine Systems Program Review, Alexandria Vg, Dec. 4-6.

McCarty, J., et al. (1999). "Stability of Supported Metal and Supported Metal Oxide Combustion Catalysts", *Catalysis Today*, 47, pp. 5-17.

Schlegel, A., et al. (1994). "$NO_x$ Formation in Lean Premixed Noncatalytic and Catalytically Stabilized Combustion of Propane", 25th Symposium on Combustion/The Combustion Institute, pp. 1019-1026.

Spivey, J., et al. (1994). "Synthesis and Characterization of $Sr_{1-x}La_xMNAl_{11}O_{19-a}$ Hexaaluminates for the Catalytic Combustion of Methane", Symposium on Environmental Catalysis/ Stationary Sources, 17(3,4):187-188.

Suh, J.K., et al. (1995). "Characterization of Transition Metal Impregnated La-Al Complex Oxides for Catalytic Combustion", *Microporous Materials*, 3, pp. 657-664.

Touchton, G. (1996). "Gas Turbines: Leading Technology for Competitive Markets," *Global Gas Turbine News*, 36(1), pp. 10-14.

Wachowski, L., et al. (1994). "Studies of Physiochemical and Surface Properties of Alumina Modified with Rare-Earth Oxides. I. Preparation, Structure and Thermal Stability", *Materials Chemistry and Physics*, 37, pp. 29-38.

Woo, S., et al. (1998). "Effect of Water Content in the Precursor Solution on the Catalytic Property and Stability of $Sr_{0.8}La_{0.2}MnAl_{11}O_{19}$ High Temperature Combustion Catalyst", *Applied Catalysis B: Environmental*, 18, pp. 317-324.

Zarur, A. and J.Y. Ying, (2000). Reverse Microemulsion Synthesis of Nanostructured Complex Oxides for Catalytic Combustion, *Nature*, 403, pp. 65-67.

\* cited by examiner

Boehmite core    Carboxylato-alumoxane structure

US 7,442,669 B2

OXIDATION CATALYSTS COMPRISING METAL EXCHANGED HEXAALUMINATE WHEREIN THE METAL IS SR, PD, LA, AND/OR MN

CROSS-REFERENCE TO RELATED APPLICATIONS

This application takes priority under 35 U.S.C. 119(e) from U.S. provisional application 60/362,586 filed Mar. 5, 2002 which is incorporated in its entirety by reference herein.

STATEMENT REGARDING FEDERALLY SPONSORED RESEARCH

This invention was made with Government support under contract #DE-FG03-99ER82902 awarded by the United States Department of Energy. The government has certain rights in the invention.

BACKGROUND OF THE INVENTION

The use of gas turbine power generators has become a very attractive alternative for satisfying the increasing power needs of the United States and other nations. For example, almost 80% of the new electrical generating capacity currently being installed in the U.S. makes use of natural gas fired gas turbines (Touchton, 1996). Unfortunately, the combustion process that occurs in these units generates ppm levels of $NO_X$ (about a 9:1 molar ratio of NO and $NO_2$) along with the primary combustion products, $CO_2$ and $H_2O$. $NO_X$ emissions pose a serious health hazard and also contribute to the formation of acid rain and the environmental damage to forests and aquatic life by acid rain, particularly in the mountains of the Northeast U.S., is well documented (Armor 1992, Hjalmarsson 1990). As a result there has been a strong emphasis on identifying technologies to reduce emissions from these units.

Reducing $NO_X$ emissions from combustion sources has been widely studied in the last decade and the work can be divided into two approaches: removing $NO_X$ from the effluent after it has been formed (post combustion control) and reducing the amount of $NO_X$ that forms during combustion (combustion modification). A number of post combustion methods have been studied, including selective catalytic reduction (SCR). In this method a reducing agent such as ammonia is injected into the waste stream, which is intended to reduce NO and $NO_2$ to nitrogen, even in the presence of percent levels of oxygen.

Although post combustion control methods show promise, they are also expensive. In addition, SCR requires the use of ammonia along with a vanadium-based catalyst; both of these compounds are hazardous and toxic. In addition to be effective, the concentration of ammonia must be continually adjusted to match the $NO_X$ concentration in the effluent. If the ammonia concentration is too low, $NO_X$ emissions will result; if it is too high, the effluent will contain ammonia. Thus, the system must contain sophisticated monitoring equipment to measure the $NO_X$ concentration and the ammonia must be extremely well distributed so that it can react with all of the $NO_X$ in the effluent.

The second strategy for reducing $NO_X$ emissions is to modify combustion conditions so that the amount of $NO_X$ that forms during combustion is reduced. The difficulty with this approach, however, is that $NO_X$ formation is a complicated process. During combustion, $NO_X$ forms by at least three different mechanisms and it can occur either in the flame zone or out of the flame. $NO_X$ formation in the flame zone is rapid and is known as "prompt" $NO_X$. Three mechanisms are responsible for prompt $NO_X$, the Fenimore, the Zeldovich, and the $N_2O$ pathways. Briefly, in the Fenimore mechanism a hydrocarbon fragment (HC) reacts with $N_2$ to form HCN, which is then converted to NO. In the Zeldovich mechanism, an oxygen atom reacts with $N_2$ to form NO and an N atom. Finally, in the $N_2O$ mechanism, an oxygen atom combines with $N_2$ to form $N_2O$ (Schlegel et al. 1994). $NO_X$ that forms in the post combustion zone is referred to as "thermal" $NO_X$. In the post combustion zone, only the Zeldovich mechanism contributes to thermal $NO_X$ and the process is slower than the Fenimore mechanism.

The primary approach to reducing $NO_X$ levels during combustion is to lower the combustion temperature. Because the concentration of $NO_X$ does not reach the value that is predicted by thermodynamic equilibrium (approximately 1 mole percent at 2000° C.), we conclude that under combustion conditions $NO_X$ formation is limited by kinetics or by the rate at which the $NO_X$ formation reactions occur during the combustion process. Under kinetically limited conditions, the rate of $NO_X$ formation is a strong function of temperature and thus lowering combustion temperatures even a small amount will significantly reduce $NO_X$ concentrations in the exhaust. Probably the best strategy to reduce combustion temperatures is to add excess air prior to combustion. In a turbine, significant amounts of air are already added downstream of the combustor to reduce the temperature to values which the turbine blades can handle, about 1300° C. and therefore rerouting some of this diluent air so that it passes through the combustor is a relatively straightforward modification.

Test results have shown that operating the combustor under lean conditions (i.e. 4% methane) can reduce $NO_X$. Arai and Machida (1991) demonstrated that if combustion is conducted at the lean limit, the combustion temperature is approximately 1900° C. (600° C. lower than that encountered in stoichiometric combustion). This decrease in combustion temperature produced a significant reduction in $NO_X$ emissions. In addition, using lean combustion to reduce $NO_X$ emissions was the goal of the Department of Energy's Advanced Turbine Systems (ATS) program. As a part of this program several major turbine manufacturers developed high efficiency lean burn combustors, with $NO_X$ emissions of less than 10 ppm (Gates 2000, Macri, 2000).

Although significant decreases in $NO_X$ emissions have been achieved, further reductions will be required to meet the increasingly restrictive regulations anticipated in the future. However, achieving further reductions in $NO_X$ emissions by optimizing lean combustion technology may be difficult because the lean combustors are operating at or very near the lean combustion limits. Thus, additional air cannot be added upstream of the combustor without dropping the fuel concentration below the lean combustion limit, which would cause unacceptable instabilities in the combustion flame. Thus, in order to achieve further reductions in $NO_X$ emissions, combustor modifications that allow the addition of more diluent air must be identified.

One approach to operating outside of the lean combustion limits is to install a combustion catalyst in the combustor of the turbine. Because catalytic oxidation does not require a flame, sufficient air can be added to drop the maximum combustion temperature to a level that produces very little $NO_X$. The challenge to this problem is identifying a catalyst that has good activity at low temperature, but that also has excellent thermal stability at high temperature. The catalyst must be able to convert methane at the temperature at which the air exits the compressor (about 350-400° C.) and it must withstand the very high temperatures encountered at the end of the combustor, which could reach 1300° C. Since traditional catalysts sinter and lose essentially all of their activity at temperatures above 800° C., the development of catalysts for catalytic combustion is an active area of research.

Because most catalysts currently available cannot tolerate very high combustion temperatures, one approach is to use a catalyst at the front end of the combustor to initiate the reaction. By limiting the conversion that occurs in this zone to less than 50%, the catalyst temperature can be maintained below 800° C., where many catalysts have adequate thermal stability. The combustion is then completed in a post-catalyst burn out zone, where the temperature can exceed 1300° C. Recent reports (Dalla Betta 1997, Dalla Betta and Rostrup-Nielsen 1999, and Spivey et al. 1994) report that the use of supported palladium catalysts for a catalytic combustor can achieve $NO_x$ emissions of between five and ten 10 ppm.

Unfortunately achieving further reductions using this strategy may be difficult. Calculations (illustrated in FIG. 1), which were carried out for a flame at 1500° C., show that about 60% of the total NO is produced as a result of the Fenimore mechanism (Schlegel et al. 1994) which occurs in the flame zone. The authors also carried out experiments in which they varied the ratio of fuel converted over an alumina-supported platinum catalyst to that converted in a post catalyst combustion zone. The total conversion was maintained at 100% and a constant flame temperature was maintained in each series. They found that for a given flame temperature, the measured $NO_X$ levels decreased in a linear fashion as the percent of fuel converted over the catalyst increased until the conversion reached about 80%. Between 80 and 100% conversion, the decrease in NO emission was more rapid. These results indicate that to reduce $NO_X$ levels below 5 ppm, conversions approaching 100% must be achieved in the presence of the catalyst. Thus, it might be necessary to eliminate the flame completely to produce further reductions in $NO_X$ emissions. One way to eliminate the flame would be to carry out the entire combustion process in the presence of a solid catalyst (Fant et al. 2000, Beebe et al. 2000).

An additional problem is associated with the use of traditional palladium catalysts supported on a high surface area material such as alumina. As the temperature increases above 800° C., palladium converts from palladium oxide to palladium metal and as the temperature drops, it reverts back to the oxide form. The combustion rate is different over the two forms of the catalyst and as a result the performance of the combustor can change with load. Designing a combustor that accommodates changing catalyst performance is difficult. It is more desirable to design the combustor based on a constant, well-characterized catalyst performance (Fant et al. 2000). Thus, if palladium is incorporated into a catalyst, it should be done in a fashion that it is retained in a single oxidation state over a wide range of conditions.

Catalytic combustion has the potential to meet future $NO_X$ emission standards as long as most or all of the combustion is carried out in the presence of the catalyst. This means that the catalyst must be able to withstand very high temperatures without undergoing deactivation. In addition, if palladium is used, it should be incorporated into the catalyst in such a way that it will not undergo the oxidation-reduction cycle which it does as a supported metal. No catalyst currently produced meets these demanding criteria. Traditional supported metal catalysts sinter and lose essentially all of their activity at these extreme temperatures. In addition, traditional supports are inert and will not inhibit the detrimental tendency of palladium to cycle between the metal and the oxide.

Because catalytic reactions occur on the surface of the catalyst, these materials must have a sufficient surface area to allow the reaction to occur at a reasonable rate. Catalysts typically are composed of metal oxides, which either have catalytic activity of their own or are used to support other active metals, which are dispersed on the support in the form of small crystallites. Iron, cobalt, and manganese are examples of oxides that have activity of their own, while alumina, silica, and titania are considered to be relatively inactive and are used to support more active metals such as platinum or palladium.

Unfortunately, both types of catalysts would not be stable under the extreme temperatures encountered during the combustion of percent levels of methane. At combustion temperatures (approaching 1300° C.), the metal crystallites in the supported catalysts would either agglomerate, which would reduce the active metal surface area or could volatilize, resulting in a permanent loss of the catalytically active metal. In addition, the metal oxide support could sinter causing the pores in the support to collapse, preventing the active metals inside these pores from being catalytically active and further reducing the available metal surface area. Likewise, catalytically active metal oxides such as those of iron, cobalt, and manganese would not be suitable for use under these conditions because they would lose essentially all of their surface area by sintering, rendering them inactive.

However, it has recently been reported that aluminum oxide ($Al_2O_3$) can be modified, potentially allowing it to have both the required activity and stability for use as a combustion catalyst. The modification is accomplished by incorporating one or more heteroatoms into the aluminum oxide structure forming a structure known as a hexaaluminate. The heteroatoms give the otherwise inert oxide good activity for methane combustion and also greatly increase its thermal stability. Once incorporated into the lattice, the aluminum oxide forms a hexaaluminate structure, which comprises a series of spinel like blocks that are separated by mirror planes containing the heteroatoms, typically alkali or alkaline earth cations (Arai and Machida 1991, Arai and Machida 1996, Suh et al. 1995, Groppi et al. 1993, Spivey 1994, Wachowski et al. 1994). This material has excellent thermal stability because the crystal growth in the direction normal to the plane is much slower than the rate of growth in the directions parallel to the plane even at temperatures of up to 1500° C. (Arai and Machida 1991). As a result, the crystals do not sinter even at very high temperatures and therefore these materials have excellent potential to be used as combustion catalysts.

Unfortunately, hexaaluminate catalysts are difficult to synthesize using conventional methods. Thus, it is difficult to synthesize catalysts that contain the desired concentrations of substituent metals, making it difficult to study activity and thermal stability on the laboratory scale and also reducing the probability of synthesizing a selected catalyst formulation for a full-scale application. Currently, hexaaluminate materials are prepared either by coprecipitation or by the hydrolysis of alkoxide precursors. In coprecipitation methods, an acidic solution of aluminum nitrate is prepared. Then the desired quantities of the one or two heteroatoms to be incorporated into the hexaaluminate are added to the solution (also as the nitrate salt). At this point, the solution is heated and stirred and the pH is raised at a controlled rate with the addition of base such as ammonium carbonate. The various metals then precipitate as hydroxides or carbonates, the solid is separated by filtration, and then heated to 1300° C.

There are two primary difficulties with this process. First, it is difficult to control the stoichiometry of the hexaaluminate product. Different metals precipitate at different pH's, and it is therefore unlikely that two or more metal oxides that are well-mixed on a micron scale will be obtained. If the two or three compounds are not in very close contact during the heating process, some portions of the alumina may contain too much heteroatom, while other portions may contain too little or none. Moreover, incorporation of two or more heteroatoms, which may be necessary to produce a very active catalyst, would be nearly impossible to control. The second problem is that the average size of the aluminum oxide particles typically is on the order of microns, requiring that the heteroatom travel these distances to incorporate evenly into the aluminum oxide matrix. However, if the migration distance is too great and the aluminum oxide remains at temperature too long without incorporating the heteroatom, then the oxide will convert to the low surface area $\alpha$ (alpha) form before the hexaaluminate structure is formed.

Another route to the production of hexaaluminate compound is the use of metal alkoxides, which are soluble in solvents such as alcohols. Catalysts are prepared by combining the aluminum alkoxide with an alkoxide of the desired cations and then adding water, which results in the formation of a gel containing the metals. Alternatively, salts of the substituent metals can be dissolved in water and then combined during the hydrolysis step (Artizzu-Duart et al. 2000). Although the use of alkoxides has been shown to produce higher surface area compounds relative to those produced by coprecipitation (Spivey 1994, Cinibulk 1995), the alkoxide precursors are expensive. In addition, they are unstable because as mentioned above the addition of water causes hydrolysis to occur and therefore they must be stored or handled in a moisture free environment. Finally, preparation of catalysts using alkoxides requires the use of large quantities of an organic solvent such as ethanol or propanol. Handling large quantities of such solvents can be difficult because they are toxic and flammable.

There has been a strong effort recently to develop catalysts that have good stability at the extreme temperatures encountered in a gas turbine combustor. Catalyst materials typically used in these studies consist of refractory metal oxides such as hexaaluminates and perovskites. In the following sections we discuss recent work on each of these materials.

Hexaaluminate combustion catalysts substituted with a wide variety of heteroatoms including barium, manganese, magnesium, strontium, lanthanum have been prepared and studied as combustion catalysts. For example Jang et al. (1999) conducted tests with coprecipitated hexaaluminates containing barium ($BaAl_{12}O_{19-\delta}$) barium and manganese ($BaMn_{0.5}Al_{11.5}O_{19-\delta}$ and $BaMnAl_{11}O_{19-\delta}$), and barium, lanthanum, and manganese ($Sr_{0.8}La_{0.2}MnAl_{11}O_{19-\delta}$). They compared the surface areas and activities of a series catalysts calcined at 1400° C. with the formula $Sr_{1-x}La_xMnAl_{11}O_{19-\delta}$ where X=0, 0.2, 0.4, 0.6, 0.8 and 1.0. They reported surface areas ranging from 12.9 to 19.2 $m^2/g$ and $T_{10\%}$ (temperatures for 10% conversion) from 450° C. to 500° C. (the $T_{1/2}$ values are about 120° C. higher than the $T_{10\%}$). The catalyst with the highest surface area and most activity was for the case where X=1 ($LaMnAl_{11}O_{19-\delta}$). They also monitored the performance of a coprecipitated hexaaluminate that was maintained at temperature of 600° C. for 100 hours and found that the conversion remained unchanged over this performance period.

Groppi et al. (1993) conducted tests with hexaaluminate-based catalysts composed of Ba-Al-O and Ba-Mn-Al-O, prepared by coprecipitation methods. Although they reported that these catalysts converted up to 40-50% of a methane feed at 600° C., at space velocity of 48,000 $h^{-1}$, they did not report any results showing that these materials are stable at combustion temperatures. In another study, Groppi et al. (2001) conducted tests with lanthanum-substituted hexaaluminate catalysts prepared by coprecipitation methods. They reported that the presence of magnesium and manganese ions increased the activity of the catalyst, resulting in $T_{1/2}$ values of between 580 and 620° C. when tested at a feed rate of 54,000 (cc feed/g cat h) which is equivalent to a GHSV of about 25000 $h^{-1}$ (cc feed/cc cat h) assuming a catalyst density of about 0.5. Again, this study did not report any data relating to the stability of the catalyst when aged at temperatures expected under combustion conditions.

In U.S. Pat. No. 5,823,761, Euzen et al. (1998) report the use of a staged injector where the second stage catalyst consists of monolithic support and a catalyst that contains cerium, iron and zirconium along with either palladium or platinum. One claim includes the use of a hexaaluminate catalyst. In U.S. Pat. No. 5,830,822 Euzen (1998) reports a thermally stable catalyst with the formula $A_{1-X}B_YC_ZAl_{12-Y-Z}O_{19-\delta}$ where A represents either barium or strontium, B is manganese, cobalt, or iron, and C is either magnesium or zinc. In tests at 50,000 $h^{-1}$, they reported $T_{1/2}$ values in excess of 650° C. Finally, in U.S. Pat. No. 5,899,679, Euzen et al. (1999) reports a two stage process where the first stage contains platinum or palladium and the second stage catalyst has the formula $A_{1-X}B_YC_ZAl_{12-Y-Z}O_{19-\delta}$, which was described in the previous patent.

Numerous studies have also been conducted on hexaaluminate that have been prepared using alkoxide precursors. For example, Artizzu-Duart et al. (2000) characterized thermal stability of barium-substituted hexaaluminates prepared in this manner. They aged their samples at 1200° C. for 24 hours and observed a significant loss in surface area and lower activity for all samples tested. The catalyst that performed the best, $BaFeMnAl_{10}O_{19}$, exhibited a small loss in activity evidenced by an increase in $T_{1/2}$ from 560 to 570° C. However, more importantly, this catalyst lost 27% of its surface area following this aging step (15 $m^2/g$ to 11 $m^2/g$). McCarty et al. (1999) also evaluated the stability of lanthanum-substituted hexaaluminates prepared using alkoxide precursors. They conducted a sintering study of a $LaAl_{11}O_{18}$ material at 1200 and 1400° C., using humid air, which more closely simulates a combustion environment. At 1200° C., the surface area of the catalyst decreased from about 36 $m^2/g$ after four hours at temperature to 24 $m^2/g$ after 11.5 hours at temperature. This represents a 33% loss in surface area in a period of only 7.5 hours at 1200° C.

Other work using hexaaluminates prepared with alkoxide precursors reports that the catalysts have activity similar to that of catalysts prepared by coprecipitation. For example, Forzotti and Groppi (1999) describe tests performed with BaMn hexaaluminates ($BaMn_XAl_{12-X}O_{19}$). At a space velocity of 48,000 $h^{-1}$, the $T_{1/2}$ values for these materials ranged from 640° C. (for X=2) to 760° C. (for X=4), which is similar to the results of Groppi et al. (2001) for barium-substituted hexaaluminates discussed above.

Several groups have investigated hexaaluminate catalysts containing strontium, lanthanum, and manganese prepared by hydrolyzing alkoxide precursors. Woo et al (1998) prepared catalysts with the formula $Sr_{0.8}La_{0.2}MnAl_{11}O_{19}$ and found that the amount of water used in the hydrolysis step affected the surface area of the material following calcination, with more water causing reduction in surface area. They obtained surface areas ranging from 15 $m^2/g$ (less water) to 4 $m^2/g$ (more water) following calcination at 1400° C. for 5 hours. Kikuchi et al. (2001) measured the stability of a thin layer of a $Sr_{0.8}La_{0.2}MnAl_{11}O_{19-\delta}$ catalyst prepared using metal alkoxides supported on a layer of aluminum titanate.

They obtained a relatively high $T_{1/2}$ of 750° C. when tested at 140,000 $h^{-1}$ provided an alumina interlayer was present. Without the interlayer, the catalyst was not as active. Finally, Spivey et al. (1994) prepared catalysts of the structure $Sr_{1-x}La_xMnAl_{11}O_{19-\delta}$. They found that $T_{10\%}$ values (temperature at which 10% conversion is obtained) of between 450° C. and 550° C. at a space velocity of 53,000 $h^{-1}$.

Wachowski et al. (1994) prepared samples of hexaaluminates substituted with La, Ce, Pr, Nd and Sm using the alkoxide method. They report that the addition of La had a much greater stabilizing effect on the surface area upon calcination at 1200° C. compared to that of Ce. With La contained in the matrix, surface areas ranged between 50 and 100 $m^2/g$ following calcination at 1200° C. On the other hand when Ce was used, the surface areas reported averaged about 10 $m^2/g$. Finally, if no cation was present, the surface area was reported to be about 1 $m^2/g$.

Zarur and Ying (2000) report a variation on the alkoxide method for preparation of a barium hexaaluminate catalyst that claims to produce catalysts in nanoparticles. After dissolving aluminum and barium alkoxide in isooctane, a reverse microemulsion was used to hydrolyze the sample. The barium hexaaluminate had a $T_{1/2}$ of about 620° C. at a space velocity of 60,000 $h^{-1}$. In addition, when ceria was added to the material the catalyst was reported to be more active, resulting in a $T_{1/2}$ of 500° C. In U.S. Pat. No. 6,413,489 (2002), Ying and Zarur report that the addition of manganese and lanthanum and cerium oxide to catalysts prepared with the reverse microemulsion also increase activity, reducing the $T_{1/2}$ from 620° C. to 530 and 590° C.

In addition to hexaaluminates, other materials including perovskites and aluminate-supported metal oxides also have been tested as combustion catalysts. For example, Jang et al. (1999) reported that a La-Mn hexaaluminate catalyst had much better thermal stability compared to a perovskite. They compared the activity of a hexaaluminate, $LaMnAl_{11}O_{19-\delta}$ following calcination at 1400° C. to two cobalt-based perovskites $Sr_{0.25}La_{0.75}CoO_3$, one, which had been calcined at 900° C. and another which had been calcined at 1200° C. The hexaaluminate and the perovskite that had been calcined at 900° C. each had $T_{1/2}$ values of about 530° C., while the perovskite calcined at 1200° C. was much less active with at $T_{1/2}$ of 680° C.

Batiot-Dupeyrat et al. (2001) examined the activity of lanthanum-based perovskites for periods of up to 25 h under operating conditions at 900° C. In all cases they reported that the activity decreased continually over the test period and they also reported that following the tests, all samples, except one, had lost a significant fraction of their original surface area. These results show that these materials are stable at 900° C. for periods of much less than 25 hours. Finally, the use of copper oxide supported on a high surface area magnesium aluminate spinel was evaluated as a combustion catalyst (Artizzu et al. 1999). The $CuO/MgAl_2O_4$ catalyst was found to undergo a severe loss in activity and surface area following aging at 1200° C. for 12 hours. After aging, the $T_{1/2}$ of this material increased from 550° C. to approximately 800° C. and the surface area dropped from 44.7 $m^2/g$ to 2.2 $m^2/g$. Hexaaluminate catalysts can also be useful for the utilization of our natural gas resources. Natural gas is the most abundant, clean, easily extractable energy source in the world today (Liu et al. 2001, Hickman and Schmidt 1993). The world-wide reserves of this resource, approximately 9000 trillion cubic feet, are large enough to replace the dwindling supplies of petroleum in the 21$^{st}$ century (Periana et al. 1993). Unfortunately it is difficult to utilize this resource economically because most of these natural gas reserves are located in remote areas of the world, far from sites of consumption. In addition, methane (which makes up 90% of natural gas) is a gas with a very low boiling point, −164° C. (Liu et al. 2001, Periana et al 1993). Thus, natural gas must be transported for very long distances in cryogenic tanks. The cost of these fuel tanks and the refrigeration processes needed to liquefy the gas result in very high transportation costs, which are passed on to the user.

Current processes that convert methane to methanol or ethane proceed through a syngas intermediate. In such processes, methane is first converted to syngas by steam reforming: This reaction produces an equilibrium mixture of products and must be run at extremely high temperature to reduce the concentration of $CO_2$. The products of this reaction frequently are run through a secondary reformer to increase the ratio of hydrogen to carbon monoxide. Finally, the mixture of syngas can be used to make either methanol or higher chain hydrocarbons either by way of the methanol synthesis or the Fischer Tropsch reactions shown below: These reactions also have technical challenges. The methanol synthesis reaction is equilibrium-limited so that multiple passes are required. In addition, the Fischer Tropsch reaction is not selective for gasoline type products but produces a range of paraffins.

An attractive alternative is to react excess methane directly with oxygen to form hydrocarbons such as ethane or ethylene by partial oxidation reactions:

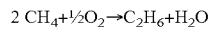
$2\ CH_4 + \frac{1}{2}O_2 \rightarrow C_2H_6 + H_2O$

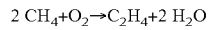
$2\ CH_4 + O_2 \rightarrow C_2H_4 + 2\ H_2O$

Such processes would eliminate the need for reforming, thereby significantly reducing the cost of converting natural gas to chemicals. In addition, other partial oxidation reactions are also potentially attractive. Economic processes to convert ethane to a chemically valuable intermediate such as ethylene would be very useful.

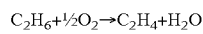
$C_2H_6 + \frac{1}{2}O_2 \rightarrow C_2H_4 + H_2O$

Unfortunately, it is extremely difficult to prevent complete oxidation and the formation of $CO_2$. Thus, a great deal of research has been conducted to identify processes to maximize the selectivity for partial oxidation products. One promising method for increasing selectivity is the recent development of short contact time reactors (SCT). As their name implies, short contact time (SCT) reactors operate at very high space velocities, with only very short periods (milliseconds) in which the reactive gases are in contact with the oxidation catalyst. Operating at very high space velocities is thought to suppress the contribution of gas phase oxidation reactions, which are not selective and always produce $CO_2$ (Feeley et al. 2002). In order to suppress the gas phase reactions, space velocities of up to 10,000,000 $h^{-1}$ have been employed. (Space velocity is the ratio of feed flow to catalyst volume and has units of $h^{-1}$). These velocities are anywhere from 10 to 100 times the values used in conventional reactors (Hohn et al. 2002, Feeley et al. 2002). The results obtained with these reactors have been impressive. For example, Feeley et al. (2002) report over 90% selectivity for CO and $H_2$ using a 2:1 mixture $CH_4$ and $O_2$, suggesting that SCT reactors may be the answer to economic methane conversion.

The problem with operating at such high space velocities is that the catalyst must have a very high activity or very little conversion will take place. As a result, the catalysts must be operated at extremely high temperatures, where the reaction kinetics are fast. Temperatures as high as 1200° C. have been reported for SCT reactors in the literature (Hohn et al. 2002). Unfortunately, the catalysts used to date in these systems undergo severe deactivation if they are maintained at these temperatures for long periods of time.

While there has been significant research directed towards the identification of thermally stable oxidation and partial oxidation catalysts, there remains a significant need in the art for such catalysts that exhibit desired levels of thermal stability and exhibit desired activity levels.

SUMMARY OF THE INVENTION

The present invention provides metal-exchanged hexaaluminate catalysts that exhibit good catalytic activity and/or stability at high temperatures for extended periods with retention of activity as combustion catalysts, and more generally as oxidation catalysts, that make them eminently suitable for use in methane combustion, particularly for use in natural gas fired gas turbines. The hexaaluminate catalysts of this invention are of particular interest for methane combustion processes for minimization of the generation of undesired levels (less than about 10 ppm) of NOx species. Metal exchanged hexaaluminate oxidation catalysts are also useful for oxidation of volatile organic compounds (VOC), particularly hydrocarbons. Metal exchanged hexaaluminate oxidation catalysts are further useful for partial oxidation, particularly at high temperatures, of reduced species, particularly hydrocarbons (alkanes and alkenes).

The hexaaluminate catalysts of this invention are prepared by a fundamentally different route compared to prior art methods that have been employed for the production of such catalysts. The method employed for synthesis of the hexaaluminate catalysts of this invention begins with the preparation of an alumoxane precursor, which is a water-soluble aluminum oxide compound. Metal substitution into the alumoxane is then carried out using water-dispersable acetylacetonate metal salts. Because the alumoxane precursor consists of very small (less than 100 nm) boehmite particles, the exchange is accomplished on an atomic scale. The use of alumoxane precursors to prepare metal aluminum oxide base materials by a solution-based metal exchange process is the subject of U.S. Pat. No. 6,207,130 which is specifically incorporated by reference herein for its teachings regarding the preparation of alumoxanes (carboxylato-alumoxanes) and metal-exchange reactions with these alumoxanes to generate metal-exchanged alumoxanes. Metal-exchanged alumoxanes are heated to form metal-exchanged hexaaluminate catalysts of this invention.

This synthetic technique has significant advantages over traditional preparation techniques, which rely on coprecipitation or hydrolysis of alkoxides. First, because the exchange is carried out on an atomic level, the substitution of heteroatoms into the alumina matrix is consistent and reliable. On the other hand, substituting heteroatoms by coprecipitation is a problem because different metal hydroxides precipitate at different pH values and therefore it is difficult to generate a mixture in which all metal hydroxides are evenly dispersed at the atomic level. In addition, alkoxides require the use of organic solvents and because small amounts of water vapor can cause hydrolysis, they require special procedures for handling. Our procedure is water-based and therefore it does not require the use of solvents. In addition none of our reagents is sensitive to moisture in the air.

In general, the metal-exchange reaction with alumoxanes can be employed to introduce a wide range of metals or metal ions into the alumoxane to generate a metal-exchanged hexaaluminate. Metal-exchanged hexaaluminates containing any one or more metal ions other than Al ions can be prepared by the metal-exchange reaction. Of particular interest, are metal-exchanged hexaaluminates in which about 1 in 24 to about 1 in 6 of the Al ions are exchanged with one or more other metal ions. Of more particular interest are metal-exchanged hexaaluminates in which about $1/12$ Al ions are exchanged with one or more other metal ions. Any hexaaluminate catalyst known in the art can be improved, in activity, thermal stability, consistency of formulation, reproducibility and uniformity of production or most simply in ease of synthesis by employing the metal-exchange reaction of this invention. Alumoxane precursors and metal acetylacetonate (Acac) metal exchange reagents are readily available. Metal ions that can be substituted or exchanged into the alumoxane include those of alkali metals, alkaline earth metals, transition metals, first row transition metals, lanthanide metals (including La), rare-earth metals and combinations thereof. Preferred metal ions for exchange into alumoxanes to form hexaaluminate catalysts include one or more of La, Ce, Nd, Sm, Eu, Gd, Er, Yb, Y, Mg, Ca, Sr, Ba, Mn, Fe, Co, Ni, Cu, Zn, Ag, Au, Zr, Rh, Ru, Pd, Pt and Ir.

In specific embodiments, hexaaluminate catalysts of this invention include those in which from about $1/24$ to about $1/6$ and preferably about $1/12$ of the Al ions are exchanges with one metal of the preferred metals listed above. More specifically the invention includes metal-exchanged hexaaluminates in which the one metal ion substituted for Al is Ba, Mn,, Sr, La, Pd, Fe, or Co. In specific embodiments, hexaaluminate catalysts of this invention include those in which from about $1/24$ to about $1/6$ and preferably about $1/12$ of the Al ions are exchanges with two metal ions of the preferred metals listed above. More specifically the invention includes metal-exchanged hexaaluminates in which the two metal ions substituted for Al are La and Mn, Ba and Ce, Ba and Mn, Sr and Pd, or La and Pd. In specific embodiments, hexaaluminate catalysts of this invention include those in which from about $1/24$ to about $1/6$ and preferably about $1/12$ of the Al ions are exchanges with three metal ions of the preferred metals listed above. More specifically the invention includes metal-exchanged hexaaluminates in which the three metal ions substituted for Al are Sr, La and Mn, Ba; La, and Mn; Sr, La and Fe; Ba, La, and Fe; Sr, La and Pd and Ba, La and Pd.

In another specific embodiment metal exchanged hexaaluminates of this invention include those prepared by metal-exchange reaction with precursor alumoxane and which have the formula:

$$M1_X M2_Y M3_Z Al_{12-(X+Y+Z)} O_{18-\alpha}$$

where:
M1 is a metal ion selected from ions of La, Ce, Nd, Sm, Eu, Gd, Er, Yb, Y and mixtures thereof;
M2 is a metal ion selected from ions of Mg, Ca, Sr, Ba and mixtures thereof;
M3 is a metal ion selected from ions of Mn, Fe, Co, Ni, Cu, Ag, Au, Rh, Ru, Pd, Ir, and Pt;
$0.5 \geq X+Y+Z \geq 2.0$; and
α is a number which rendered the composition charge neutral.

Preferably X+Y+Z is about 1.0 and any one or two of X, Y or Z can be 0. Of particular interest are hexaaluminates in which M1 are ions of La, and Ce. Of particular interest are hexaaluminates in which M2 are ions of Sr and Ba. Of particular interest are hexaaluminates in which M3 are ions of Pd, Mn, and Fe.

Over 200 hexaaluminate catalysts have been prepared using the alumoxane method and their structures are consistent with hexaaluminate materials. In addition the concentrations of substituted heteroatoms typically agreed with the target values. We have also assessed the hexaaluminate catalysts for methane combustion activity following preparation and after aging them for a period of 50 hours at high temperatures in a simulated combustion environment and found that they have excellent thermal stability.

Metal exchanged hexaaluminate catalysts of this invention are also useful for reaction of excess methane directly with oxygen to form hydrocarbons such as ethane or ethylene by partial oxidation reactions or for reaction to convert ethane to a chemically valuable intermediate such as ethylene. Hexaaluminate catalysts of this invention are of particular interest for use in short contact time reactors (SCT).

The invention provides metal-exchanged hexaaluminate catalysts, methods for making those catalysts employing a metal-exchange reaction with a precursor alumoxane, catalytic methods employing these catalysts for oxidation and partial oxidation of various reduced species, such as alkanes and alkenes, particularly lower alkanes (C1-C4) and specifically methane and methane-containing gases, such as natural gas.

DETAILED DESCRIPTION OF THE INVENTION

This invention relates to hexaaluminate catalysts prepared by metal exchange reactions employing an alumoxane precursor. Alumoxanes are inorganic polymers consisting of carboxylic acids covalently bound to a boehmite core (Kareiva et al. 1996, Kareiva et al. 2001, Harlan et al. 1997). The invention is based at least in part, on the discovery that hexaaluminates made by this method are very stable at high temperatures compared to hexaaluminates prepared by other methods, such as coprecipitation.

The use of alumoxanes as precursors have several synthetic advantages over other methods for preparing hexaaluminate catalysts. First, the boehmite particles are very small, between 10 and 100 nm. In addition, after the boehmite particles are bound with carboxylic acids, they are also water-soluble. But, perhaps the most significant advantage alumoxanes have over traditional precursors is that the metal exchange (of Al for one or more other selected metals) can be accomplished using the acetylacetonate (Acac) of the desired metal and therefore, the metal exchange can be made at the atomic level.

There are several significant advantages to this preparation technique. First, because all of the metals to be incorporated in the hexaaluminate lattice can be exchanged directly into these extremely small particles, the diffusion distances are greatly reduced. Rather than being required to diffuse over micron ranges as would be expected for coprecipitated particles, atoms incorporated into the boehmite lattice may only have to diffuse a distance of several atoms, or on the order of angstroms. This greatly reduces the time required for the hexaaluminate phase to form.

Second, by adjusting the relative amounts and concentrations of the alumoxane and metal-Acac compounds, catalyst precursor particles can be prepared that are exchanged at the atomic level producing a known and well-controlled stoichiometry. In addition, the exchange can be carried out with two or more metals. Thus, this synthetic procedure can be used to rapidly prepare materials for testing as catalysts with varying metal content, each containing well-defined concentrations of heteroatoms.

Figure 1:
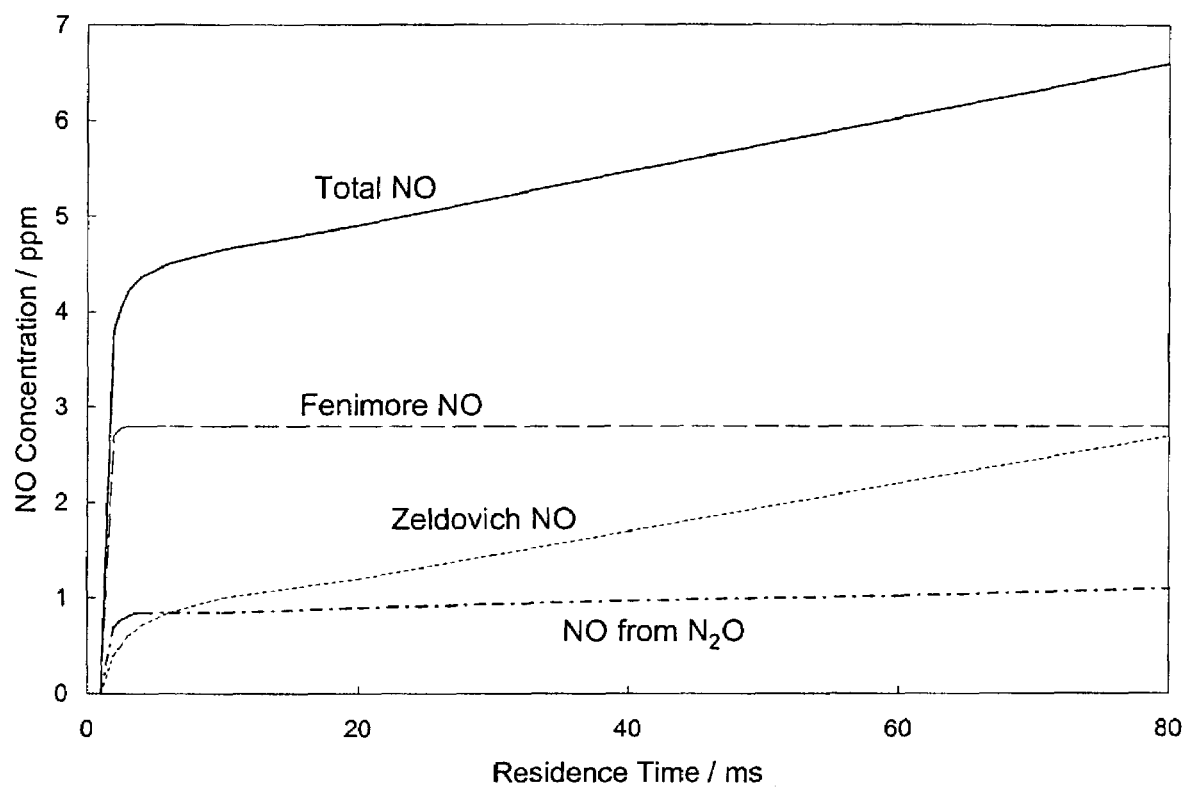
FIG. 1 is a graph which shows the calculated contributions of three different NO formation mechanisms to the total NO in a flame at 1500° C. (from Schlegal et al. 1994).
Figure 2:
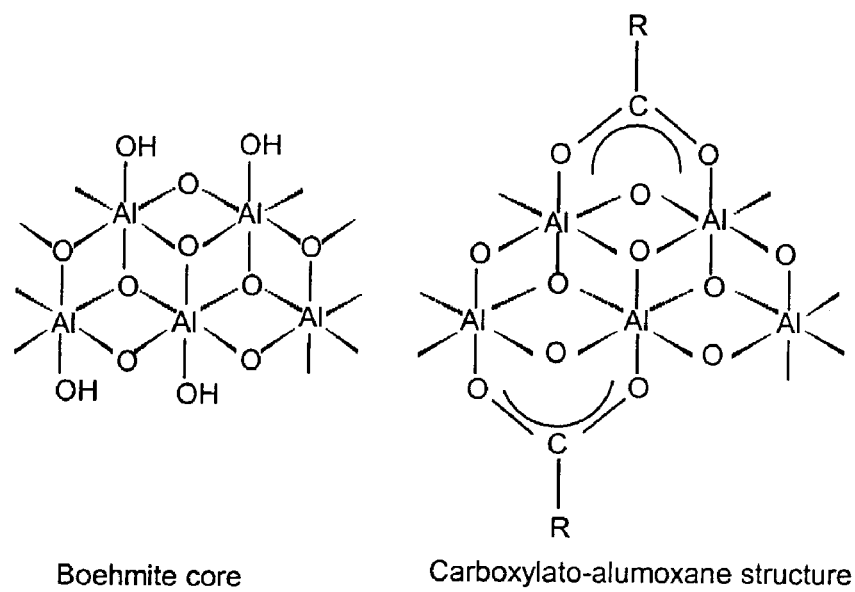
FIG. 2 illustrates the structure of a boehmite and a carboxylato-alumoxane which is a boehmite particle with a carboxylic acid attached to it.

There are two primary steps in the preparation of the hexaaluminate catalysts. The first step is the preparation of the alumoxane precursor. The alumoxane precursor is synthesized by attaching carboxylic acid ligands to a boehmite particle. The conversion of boehmite into a water-soluble alumoxane (referred to as carboxylato-alumoxane) compound is illustrated in FIG. 2. We used a 12:1 molar ratio of boehmite to carboxylic acid, and found that this formed a stable alumoxane sol.

Figure 3:
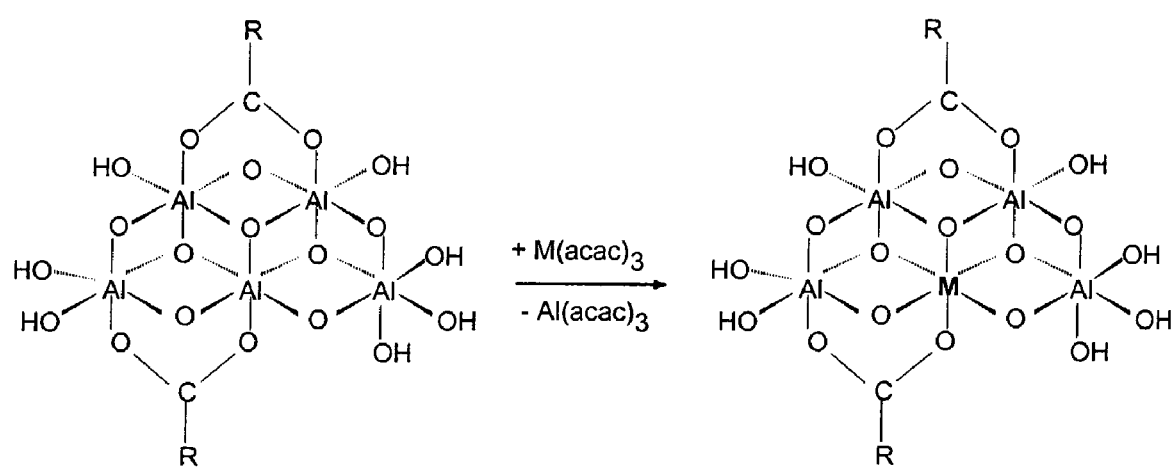
FIG. 3 is a schematic of the metal exchange reaction of a carboxylatoalumoxanes.

The next step in the process is the introduction of metal cations into the boehmite core of the carboxylato-alumoxane (FIG. 3). We carried out this step by stirring the aqueous alumoxane solution with selected amounts of selected metal acetylacetonates. The solution is usually heated for a short period of time, about four hours. After heating, we dried the mixture in an oven at 80° C., and finally, heated it at a rate of 3° C./min to a temperature of about 800° C. where it was maintained for about 1 h. The resulting compound (a metal-exchanged alumoxane)was removed from the oven, ground to a fine powder, and then heated to about 1300° C. at 3° C./min. The samples were maintained at this temperature for about 1 h.

$^{27}$Al NMR studies indicate that during the exchange reaction aluminum cations ($Al^{3+}$) are extracted from the lattice as $Al(Acac)_3$ and replaced by the metal cation contained in the exchange reagent Acac complex. The very high stability of the aluminum Acac compound serves as the driving force for the reaction and makes the substitution reaction very predictable and reproducible.

In the metal-exchanged aluminates of this invention at least about $\frac{1}{12}$ of the Al cations of the alumoxane are exchanged for other metal ions. The Al may be exchanged for one or more other metal cations. In exemplified embodiments the Al is exchanged or one other metal ion, two other metal ions, or three other metal ions. Hexaaluminate catalysts are formed by sintering powders of the metal-exchanged alumoxanes that result from the metal exchange reaction.

The hexaaluminate catalysts of this invention exhibit increased stability at high temperatures compared to hexaaluminate catalysts prepared by other methods. Stability is assessed as retention of catalytic activity as a function of aging of the catalyst at a given high temperature, e.g., subjecting the hexaaluminate to a prolonged period of heating, particularly under environmental conditions (humidity, presence of $CO_2$, etc) which simulate the environment in which the catalysts will be used. More specifically, one means for assessing catalysts activity is by measurement of the temperature corresponding to conversion of ½ of the methane in a feed stream ($T_{1/2}$). Alternative, assessments of activity measure the temperature corresponding to conversion of 10% of the methane in a feed stream (T10%). Comparisons made using measurements of $T_{1/2}$ or T10% should provide similar results, $T_{1/2}$ measurements are used herein. These temperature measurements can provide a single figure of merit, which can be used to compare the activity of a number of catalyst samples of different composition. Alternatively, because catalyst activity as a combustion catalysts is generally directly proportional to catalyst surface area, relative activity of a given catalyst can be assessed by measurement of changes in catalyst surface area, e.g., as % increases or decreases in surface area. Thus, changes in the surface area of a given catalyst as a function of its exposure to an adverse environment (e.g., high temperatures) can be assessed by following changes in catalyst surface area.

Metal-exchanged hexaaluminate catalysts of this invention have exhibited high thermal stability with retention of about 50% or more of their initial surface area after about 50 h of aging at 1300° C. under simulated combustion conditions. Preferred metal-exchanged hexaaluminate catalysts of this invention for use particularly in high temperature applications over about 700° C. exhibit less than about a 75% decrease in surface area (compared to their initial "as prepared" surface area) on heating at 1300° C. under simulated combustion conditions. More preferred metal-exchanged hexaaluminate catalysts of this invention for use particularly in high temperature applications over about 700° C. exhibit less than about a 50% decrease in surface area on heating at 1300° C. under simulated combustion conditions. Yet more preferred metal-exchanged hexaaluminate catalysts of this invention for use particularly in high temperature applications over about 700° C. exhibit equal to or less than about a 35% decrease in surface area on heating at 1300° C. under simulated combustion conditions.

Metal exchanged hexaaluminate catalysts of this invention have exhibited $T_{1/2}$ as low as about 360° C.-420° C. even after aging at 800° C. for up to 50 h. Preferred metal exchanged hexaaluminate catalysts of this invention exhibit $T_{1/2}$ equal to or less than about 500° C. even after aging at 800° C. for up to 50 h. More preferred metal exchanged hexaaluminate catalysts of this invention exhibit $T_{1/2}$ equal to or less than about 450° C. even after aging at 800° C. for up to 50 h. Yet more preferred metal exchanged hexaaluminate catalysts of this invention exhibit $T_{1/2}$ equal to or less than about 400° C. even after aging at 800° C. for up to 50 h.

Metal exchanged hexaaluminate catalysts of this invention have exhibited initial surface areas of 10 $m^2/g$ or more "as prepared." Preferred hexaaluminate catalysts are those that exhibit the highest initial surface area and which exhibit the lowest % decrease in surface area on heating at 800° C. or 1300° C. It is generally the case, that a catalyst will exhibit a higher % decrease in surface area if it is aged at a higher temperature. As noted above, aging is intended to demonstrate the stability of a catalyst under the conditions to which it is expected to be subjected during use. Catalyst stability or activity could be assessed under environmental conditions other than those specifically employed in examples herein that would be more representative of its potential application.

Metal exchanged hexaaluminate catalysts of this invention are particularly useful as oxidation and combustion catalysts. In this regard, catalysts of this invention can be employed in art-known combustion methods which employ catalysts to increase efficiency, or decreased undesired by-products of combustion. Metal-exchanged hexaaluminate catalysts of this invention can, for example be employed in methods describe in U.S. Pat. Nos. 5,823,761; 5,830,822; 5,899,679; 5,915,951; 6,298,664 and 6,334,987.

EXAMPLES

We have examined two different types of catalysts that will be useful in methane combustion systems, including natural gas fired turbines, for example in a first and a second stage of a combustor. The catalyst used in the first stage should be sufficiently active that combustion begins at approximately 400° C. As the reaction proceeds and the temperature of the feed mixture increases to approximately 700° C., the gas mixture is directed over the second catalyst, which is used to complete the combustion reaction.

The two catalysts used in a two-stage combustion configuration have different requirements. The catalyst used in the first stage is preferably very active; however it only has to be stable at temperatures up to 800° C. (about 100° C. greater than the maximum temperature to which it will be exposed). The second stage catalyst must have excellent stability at temperatures up to 1300° C., however, it does not have to be as active as the first stage catalysts (although it is preferably as active as possible), because the reactants will contact second stage catalysts at temperatures in excess of 700° C.

To measure the catalyst activity for methane combustion, we placed approximately 0.5 g sample in a test apparatus, flowed a mixture of 3% methane in air over the catalyst at a pressure of 75 psi and a flow rate corresponding to 17,000 cc feed per cc of catalyst per hour or a gas hourly space velocity (GHSV) of 17,000 $h^{-1}$. We then monitored $CO_2$ production as a function of temperature and calculated the temperature corresponding to conversion of ½ of the methane feed stream ($T_{1/2}$). This value represents a single figure of merit, which can be used to compare the activity of a number of catalyst samples.

We measured activity for methane combustion on the samples after preparation and also after aging. The first stage catalysts were aged at 800° C. for both 16 and 50 hours while the second stage catalysts were aged for 50 hours at 1300° C. In all cases, we simulated a combustion environment during the aging process by passing air containing 6% $CO_2$ and 6% $H_2O$ over the catalysts.

First Stage Catalysts

Figure 4:
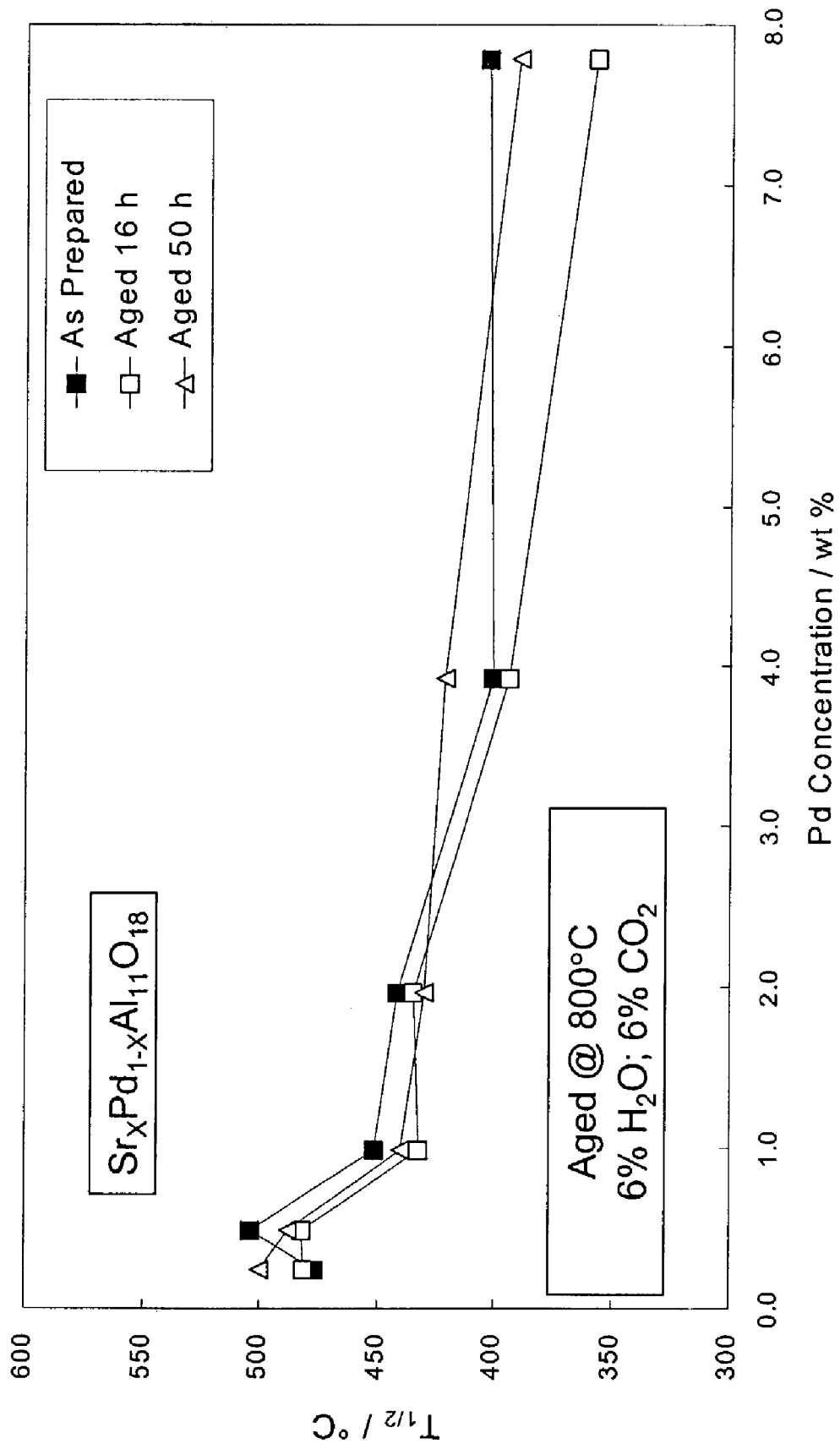
FIG. 4 is a graph of $T_{1/2}$ values obtained for a series of Sr-Pd catalysts as a function of palladium loading at three different conditions: as prepared, aged at 800° C., for 16 hours, and aged at 800° C. for 50 hours.

We prepared one series of catalysts of the stoichiometry $Sr_{1-x}Pd_xAl_{11}O_{18}$ where X=0.5, 0.25, 0.125, 0.0625, 0.0312. This series produced palladium loadings ranging from 7.8 wt % at X=0.5 to 0.25 wt % at X=0.0312. The results of tests performed on the "as prepared" and aged samples (aged at 800° C.) in this group are shown in FIG. 4. The figure shows that the $T_{1/2}$ values for Pd loadings of 1 wt % and higher are no greater than 450° C. Considering that oxidation activity begins at temperature of at least 50° C. lower than the $T_{1/2}$ values, these catalysts appear to have the sufficient initial activity that would be suitable in a gas turbine. In addition the data presented in this figure shows that all catalysts in this group are very stable. In all cases except the lowest palladium loading, there is very little change in the $T_{1/2}$ value between the "as prepared" and "aged" samples. Aging at 800° C. under combustion conditions does not significantly affect catalyst activity except at low loading of Pd These results particularly for the catalysts containing 0.5, 1.0 and 2.0 wt percent Pd, are very encouraging for several reasons. First, the activities of these materials are very high ($T_{1/2}$ of about 400° C.) under these test conditions. In addition, the figure shows that the activity of three of these catalysts (0.5, 1.0 and 2.0 wt % Pd) did not change significantly after being exposed to a temperature at least 100° C. higher than would be encountered under operating conditions for a period of 50 hours. Finally, the catalysts having the best combination of activity and stability included those that contained no more than about 2 wt % Pd, which suggests that these catalysts would not be too expensive to be used in a combustor.

Second Stage Catalysts

Figure 5:
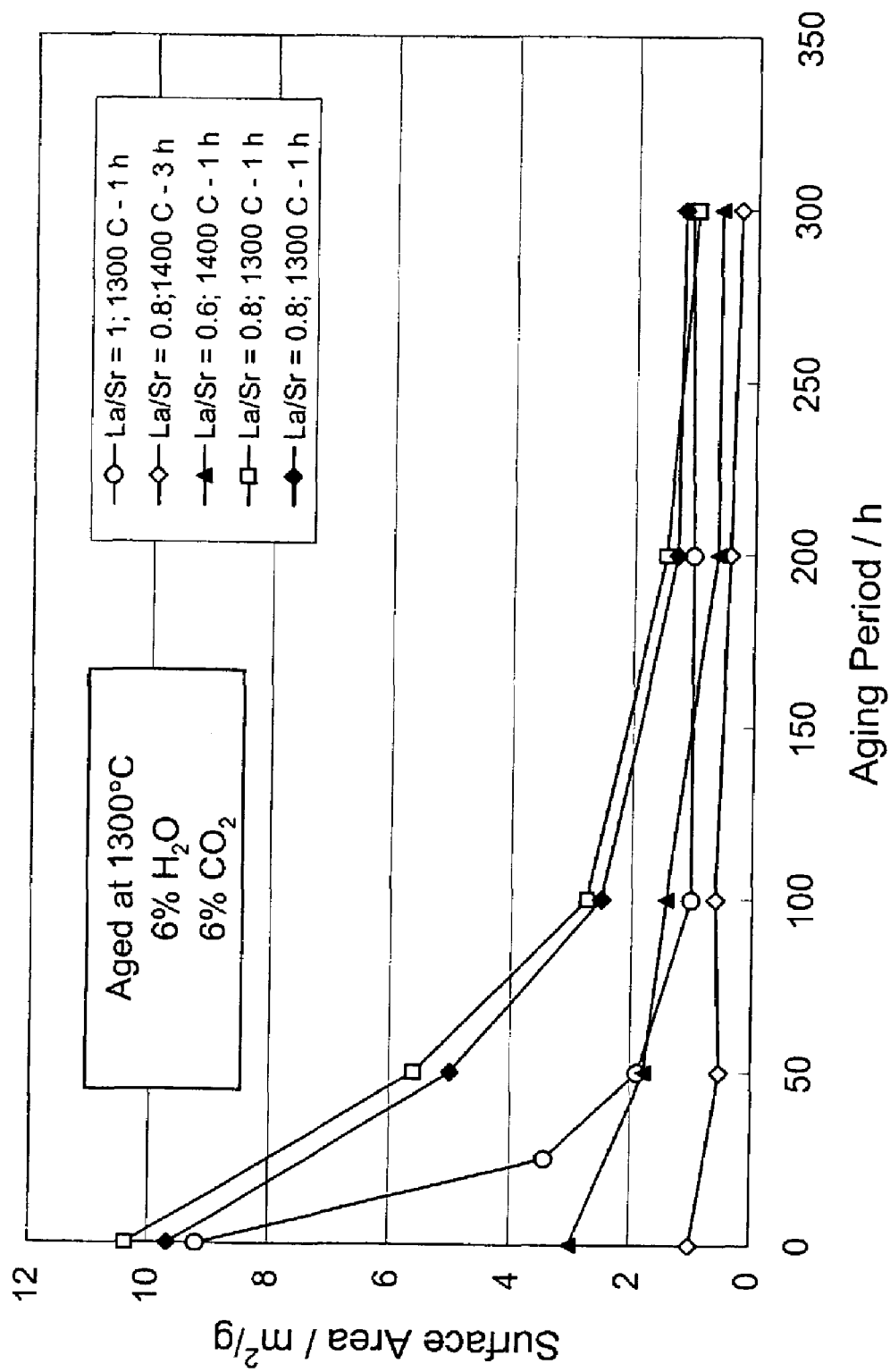
FIG. 5 is a graph of $T_{1/2}$ values obtained for a series of hexaaluminate catalysts containing La, Sr, and Mn as prepared and after aging at 1300° C. for 50 hours in a simulated combustion environment.

We have also identified catalysts that would be suitable for use in the second stage of the combustion reactor where much higher temperatures would be encountered. We prepared several groups of catalysts substituted with three metals, La, Sr, and Mn. We synthesized samples of the stoichiometry $La_xSr_yMn_zAl_{11}O_{18-\alpha}$ (in which we set Z equal to 0.2, 0.4, 0.6, 0.8, where a is a number that makes the compound charge neutral, and for each value of Z, we prepared samples where X/Y=to 0.25, 0.5, 1.0, and 2.0, while maintaining the sum of X+Y equal to 1−Z. Our initial results indicated that the best results were obtained for Z=0.4 and X/Y equal to 1. We then prepared additional samples where Z was equal to 0.4 and varied the ratio of X/Y from 0.5 to 1.5 in increments of 0.1. The $T_{1/2}$ values obtained for the as prepared and aged samples of this group are shown in FIG. 5. This figure shows that the as prepared $T_{1/2}$ values for this group of catalysts (white bars) vary from 544° C. to about 575° C. Again this group of catalysts has acceptably high initial catalyst activity. (The fluid temperature likely will be in excess of 650° C. before it contacts the second stage catalyst). Moreover, the results following aging at 1300° C. for a 50 hour period, also included (as the black bars) indicate that several catalysts in this group have excellent thermal stability as evidenced by little or no change in $T_{1/2}$ compared to the as prepared values. An increase in $T_{1/2}$ indicates a decrease in activity and a decrease in $T_{1/2}$ indicates an increase in activity. For example the post aging $T_{1/2}$ value for catalysts with La/Sr of 0.5, 0.6, 0.8 and 1.1 are all slightly lower (within experimental error) compared to the "as prepared" values, indicating that exposure to the severe conditions (1300° C. with 6% water) caused no loss in combustion activity. Further, even the catalysts that lose activity (e.g., those with La/Sr of 1.2-1.5) do not undergo severe losses. The largest increase observed in $T_{1/2}$ was about a 45° C. increase representing an increase of about 8% (45/545). Typically, the $T_{1/2}$ increases by only 30-40° C. following the aging step. Considering that the sintering process occurs most rapidly in early periods of exposure to extreme conditions, the results of our testing demonstrate that hexaaluminate catalysts with these formulations have excellent thermal stability.

Figure 6:
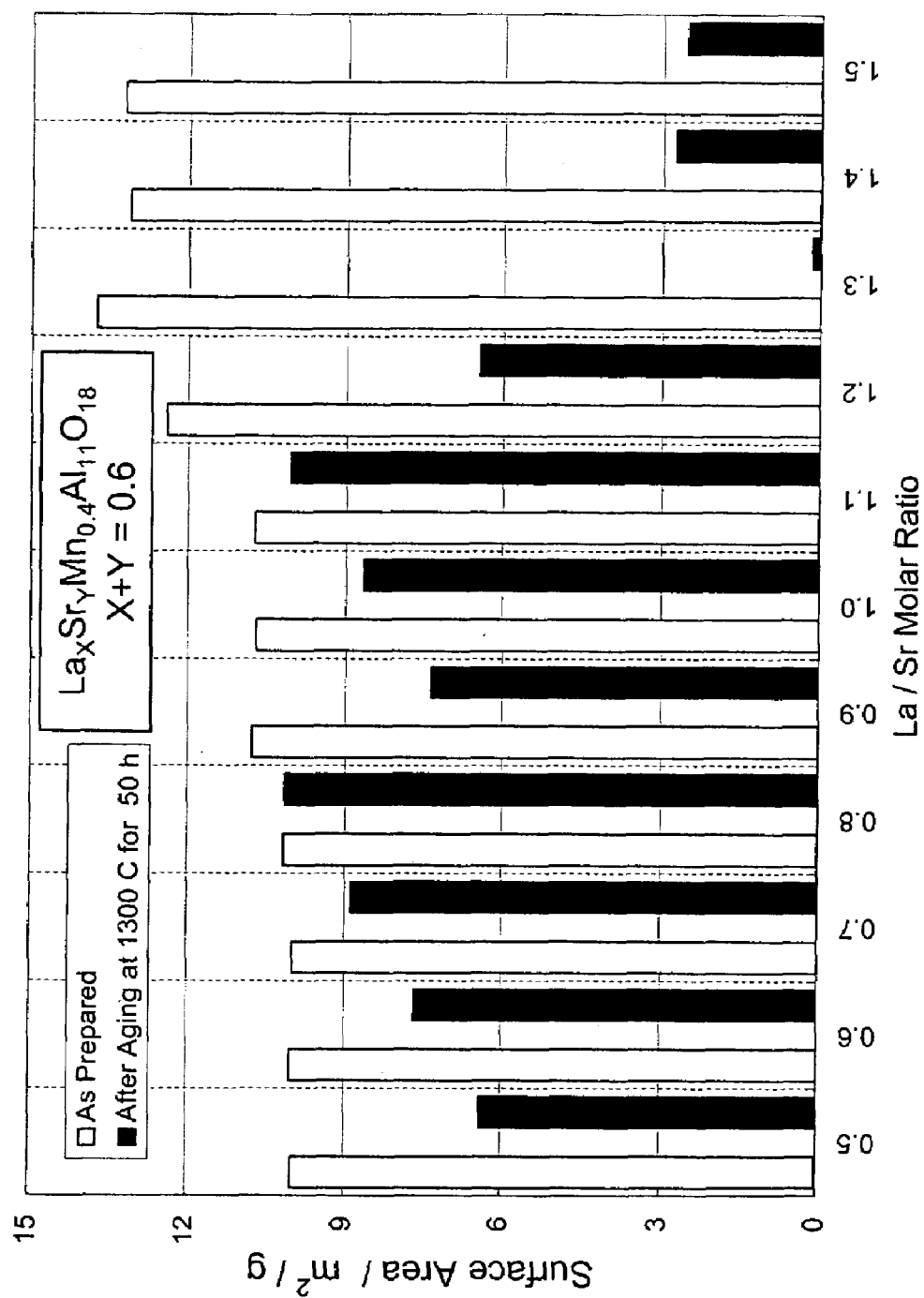
FIG. 6 is a graph showing the surface areas of the hexaaluminate catalysts containing La, Sr, and Mn as prepared and after aging at 1300° C. for 50 hours in a simulated combustion environment.

The surface areas obtained for this group of catalysts were measured by the BET method and are shown in FIG. 6. Overall these results are consistent with the activity measurements presented in FIG. 5. The data show that the surface areas for catalysts with La/Sr ranging from 0.5 to 0.8 change very little following aging. For La/Sr=0.8 we see that the surface area is about 10 m²/g both before and following aging. In addition catalysts with La/Sr=0.7 and 1.1 exhibit only about 10% losses in total surface area. There is relatively good correlation between surface area and catalyst activity. The catalyst with La/Sr=0.7 exhibited a small loss in activity following aging as evidenced by an increase in $T_{1/2}$ from 575 to 590° C. However catalysts with La/Sr=0.8 and 1.1 exhibited no increase in activity following aging, which is consistent with surface area data presented here.

Comparison to Coprecipitated Catalysts

We performed a direct comparison of two catalysts prepared by the alumoxane/metal-exchange technique to those of identical stoichiometry prepared by coprecipitation methods. We measured the surface area of each catalyst as prepared and then aged each sample at 1300° C. for 50 hours in an environment containing 6% water and 6% $CO_2$ in order to simulate a combustion environment. We first prepared a stock solution of alumoxane, specifically 2(2-(2-methoxyethoxy)ethoxy)acetato alumoxane (MEEA-alumoxane). We combined 7000 g of a commercially available boehmite sol (Disperal Sol P2) solution with 1050 g of psuedo boehmite (CatapalA) (AlOOH ·x$H_2O$) and 472.5 g MEEA. The solution was maintained at 94° C. for 24 hours. To prepare the $La_{0.27}Sr_{0.33}Mn0.4Al_{11}O_{18}$ hexaaluminate (La/Sr=0.8), we combined 50 g of the MEEA-alumoxane with 0.979 g manganese acetylacetate [Mn(Acac)$_2$], 1.136 g lanthanum acetylacetate [La(Acac)$_3$], and 0.922 g strontium acetylacetate [Sr(Acac)$_2$]. For the $La_{0.30}Sr_{0.30}Mn_{0.4}Al_{11}O_{18}$, hexaaluminate, we combined 50 g of the MEEA-alumoxane with 0.979 g manganese acetylacetate [Mn(Acac)$_2$], 1.265 g lanthanum acetylacetate [La(Acac)$_3$], and 0.828 g strontium acetylacetate [Sr(Acac)$_2$]. We mixed the solutions at 60° C. for four hours and then dried the mixture for 16 hours at 120° C. After the material was dry, we heated it at 3° C./min to 800° C. and held the material at this temperature for one hour before cooling it to ambient temperature. We then removed the material, ground it to a fine power, and calcined it again. For the second calcination, we heated it at 3° C./minute to a maximum temperature of 1300° C. and maintained the material at this temperature for one hour before cooling.

We prepared the coprecipitated $La_{0.30}Sr_{0.30}Mn_{0.4}Al_{11}O_{18}$ sample (La/Sr=1.0) by dissolving the 82.5 g $Al(NO_3)_3 \cdot 9 H_2O$, 2.597 g $La(NO_3)_3 \cdot 9 H_2O$, 1.270 g $Sr(NO_3)_2$ and 1.423 g $Mn(NO_3)_2$ in 100 ml water. We then heated the solution and slowly added a base made by dissolving 40 g ammonium carbonate in 200 ml water, until the pH reached a value of 10, where precipitation was complete. After filtering the mixture, we dried the solid residue overnight at 120° C. and calcined the material at 1300° C. for one hour. We prepared the coprecipitated $La_{0.27}Sr_{0.33}Mn_{0.4}Al_{11}O_{18}$ (La/Sr=0.8) sample by dissolving the 82.5 g $Al(NO_3)_3 \cdot 9 H_2O$, 2.340 g $La(NO_3)_3 \cdot 9 H_2O$, 1.397 g $Sr(NO_3)_2$ and 1.423 g $Mn(NO_3)_2$ in 100 ml water and followed the same precipitation procedure described above.

Figure 7:
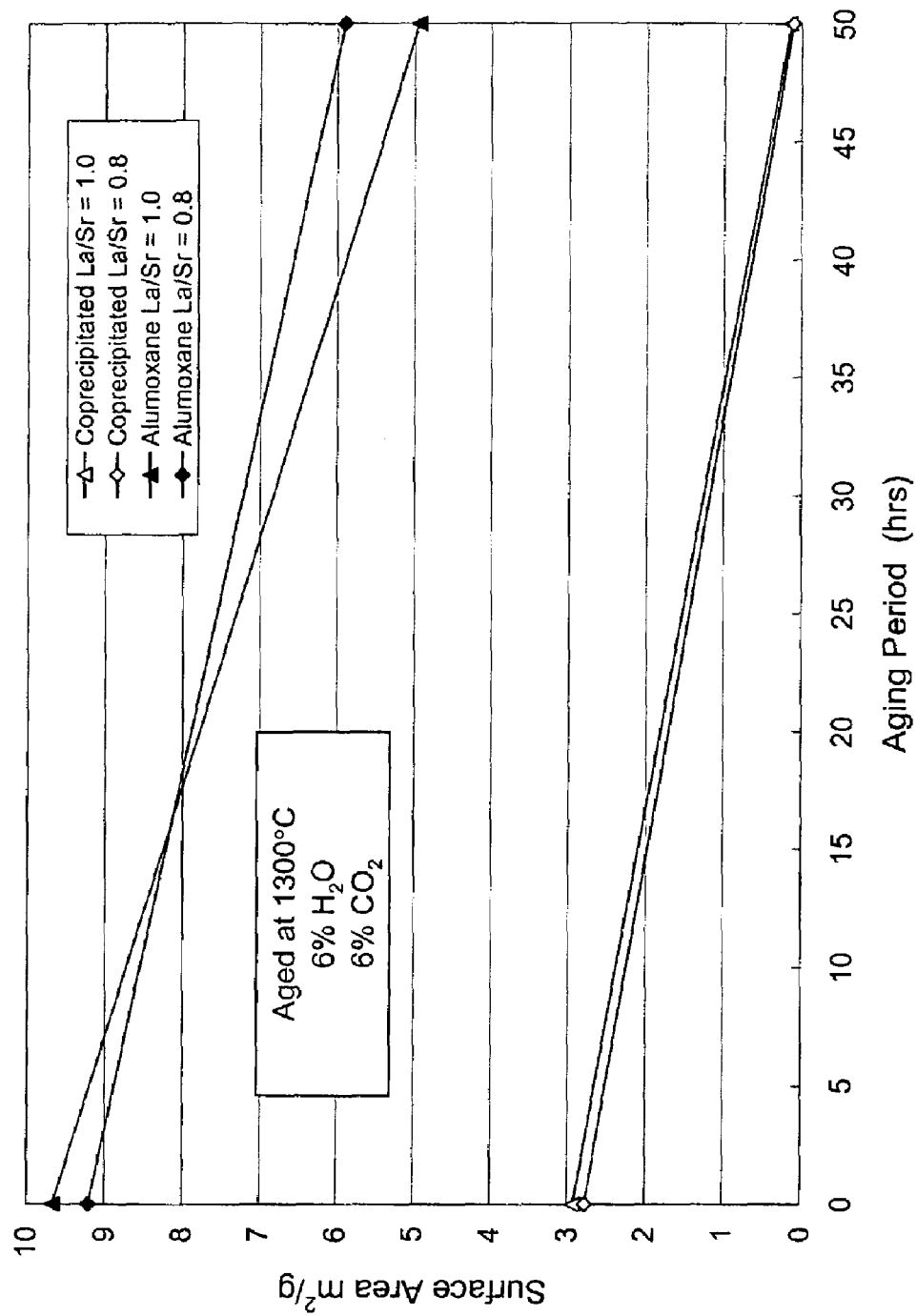
FIG. 7 is a graph comparing the surface areas of two hexaaluminate catalysts prepared by the alumoxane method to two catalysts of the same composition prepared by coprecipitation.

We compared the surface areas of the two hexaaluminate catalysts prepared by the alumoxane method to those prepared by coprecipitation both after preparation and after aging at 1300° C. in a simulated combustion environment for 50 hours. The results of this comparison are shown in FIG. 7. The figure shows that the two catalysts prepared by the alumoxane method have higher initial surface areas, 9.7 and 9.2 m²/g for La/Sr=1.0 and 0.8 respectively, compared to those of the corresponding compositions prepared by coprecipitation (2.9 and 2.8 m²/g, respectively). In addition, the coprecipitated samples lose a much higher percentage of surface area after aging compared to the catalysts prepared by the alumoxane/metal exchange method. After 50 hours in a simulated combustion environment the coprecipitated samples have surface areas of 0.15 and 0.11 m²/g for compositions La/Sr=1.0 and 0.8 respectively. These values represent losses of 95 and 96% of the original surface areas of these coprecipitated samples. On the other hand the data gathered shows that catalysts prepared by the alumoxane have much greater thermal stability. For the sample where La/Sr=1.0 the surface area following aging is 4.9 m²/g, which is 51% of the surface area prior to aging. For the sample where La/Sr=0.8, the surface area after aging is 5.9 m²/g which is 64% of the original value.

This comparison demonstrates that the use of the alumoxane/metal exchange method produces hexaaluminate catalysts that are significantly more thermally stable that those prepared by other methods, particularly by coprecipitation. It is believed that the metal exchange method results in a hexaaluminate with a more homogeneous structure.

Extended Aging Study

We also conducted aging studies on selected catalyst for periods of up to 300 hours to determine the effect of stoichiometry and calcination conditions on the thermal stability of the hexaaluminate materials. We prepared five different catalyst samples by the alumoxane method. Three samples had the composition $La_{0.27}Sr_{0.33}Mn_{0.4}Al_{11}O_{18}$ (La/Sr=0.8); two of these were calcined at 1300° C. for one hour and the other was calcined at 1400° C. for one hour. The fourth sample had the composition $La_{0.30}Sr_{0.30}Mn_{0.4}Al_{11}O_{18}$ (La/Sr=1) and was calcined at 1300° C. for one hour, while the fifth sample had the composition $La_{0.23}Sr_{0.37}Mn_{0.4}Al_{11}O_{18}$ (La/Sr=0.6) and was calcined at 1400° C. for one hour. All samples were aged at 1300° C. in an environment containing 6% water and 6% $CO_2$.

Figure 8:
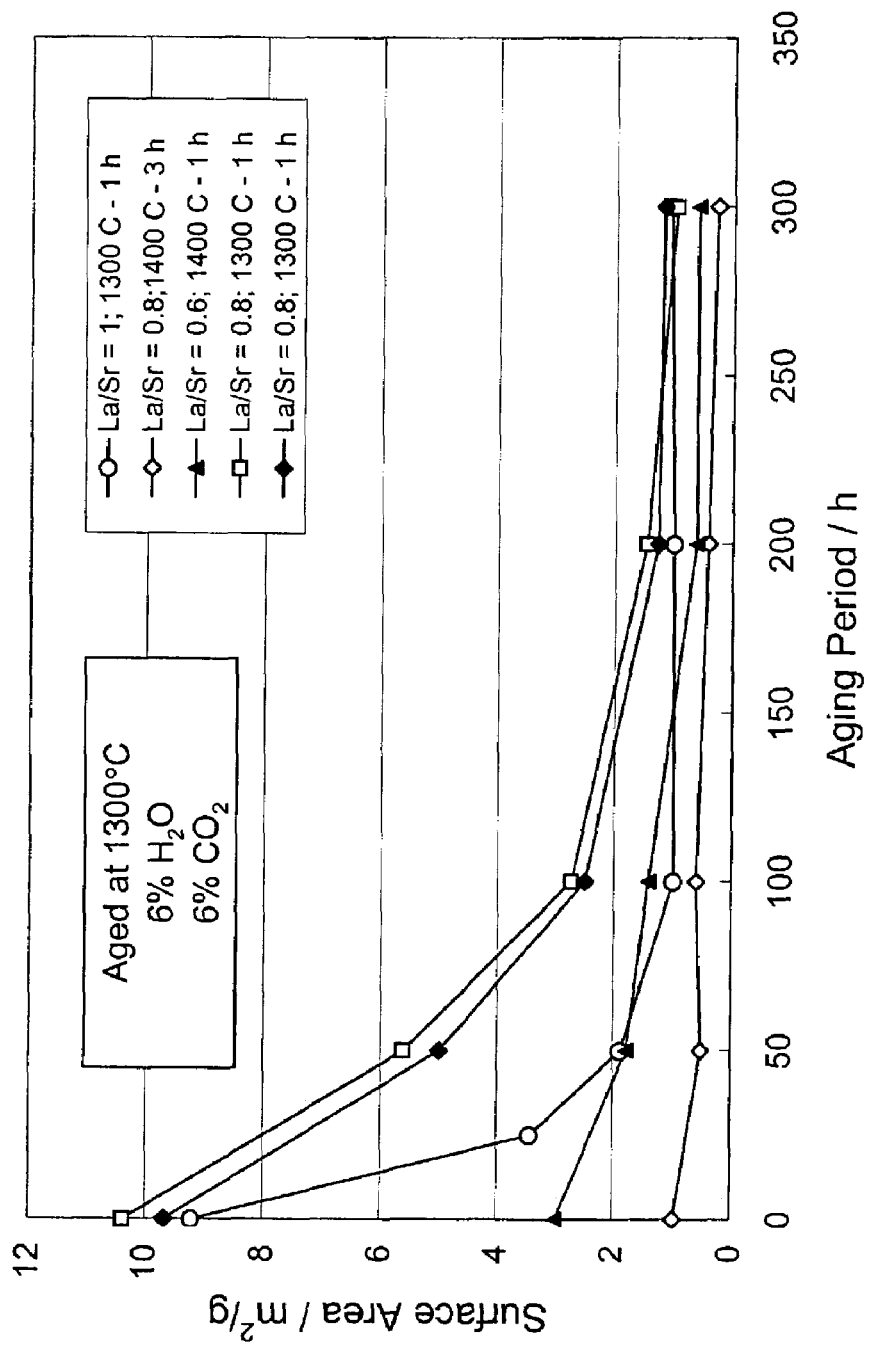
FIG. 8 is a graph showing the surface areas of several hexaaluminate catalysts prepared by the alumoxane method as a function of time at 1300° C. in a simulated combustion environment.

The results of these tests are shown in FIG. 8. The data collected shows that the samples tend to lose surface area for the first 100 hours of aging, but after this period the rate of loss is greatly reduced. In most cases, there is very little loss in surface area after 200 hours and the surface areas are reasonably high at this point, ranging from 0.3 m2/g for the Sr/La=0.8 that was calcined at 1400° C. up to 1.2 m2/g for the catalyst with the same formulation that was calcined at 1300° C. for one hour. In addition because the slopes of the lines are relatively flat between 200 and 300 hours, we conclude that it is likely that very little change in surface areas will occur with increased aging periods.

REFERENCES

Arai and Machida (1991). "Recent Progress in High-Temperature Catalytic Combustion", *Catalysis Today*, 10, pp. 81-94.

Arai and Machida (1996. "Thermal Stabilization of Catalyst Supports and their Application to High-Temperature Catalytic Combustion", *Applied Catalysis*, 138, pp. 161-176.

Armor, J. N. (1992). "Environmental Catalysis," *Applied Cat. B. Environmental*, 1, p. 221.

Artizzu, P., E. Garbowski, M. Primet, Y. Brulle, and J. Saint-Just (1999). "Catalytic Combustion of Methane on Aluminate-Supported Copper Oxide", *Catalysis Today*, 47, pp. 83-93.

Artizzu-Duart, P., J. Millet, N. Guilhaume, E. Garbowski, and M. Primet (2000). "Catalytic Combustion of Methane on Substituted Barium Hexaaluminates", *Catalysis Today*, 59, pp. 163-177.

Batiot-Dupeyrat, C., F. Martinez-Ortega, M. Ganne, and J. Tatibouet (2001). "Methane Catalytic Combustion on La-based Perovskite Type Catalysts in High Temperature Isothermal Conditions", *Applied Catalysis A. General*, 206, pp. 205-215.

Beebe, K. W., K. D. Cairns, V. K. Pareek, S. G. Nickolas, J. C. Sclatter, T. Tsuchiya (2000). "Development of Catalytic Combustion Technology for Single-Digit Emissions from Industrial Gas Turbines", *Catalysis Today*, 59, pp. 95-115.

Cinibulk, M. (1995). "Synthesis and Characterization of Sol-gel Derived Lanthanum Hexaaluminate Powders and Films", *J. Mater. Res.*, 10, pp. 71-76.

Dalla Betta, R. A. (1997). "Catalytic Combustion Gas Turbine Systems: the Preferred Technology for Low Emissions Electric Power Production and Co-Generation", *Catalysis Today*, 35, pp. 129-135.

Dalla Betta, R. A. and T. Rostrup-Nielsen (1999). "Application of Catalytic Combustion to a 1.5 MW Industrial Gas Turbine", *Catalysis Today*, 47, pp. 369-375.

Euzen. P., J. H. Le Gal, G. Martin (1998). "Process for Catalytic Combustion with Staged Fuel Injection", U.S. Pat. No. 5,823,761.

Euzen. P. (1998). "High Temperature Resistant Oxidation Catalyst, A Process for its Preparation and a Combustion Process Using This Catalyst", U.S. Pat. No. 5,830,822.

Euzen. P., J. H. Le Gal, G. Martin (1999). "Catalytic Combustion Process Using a Plurality of Successive Catalytic Zones", U.S. Pat. No. 5,899,679.

Fant, D. B., G. S. Jackson, H. Karim, D. M. Newburry, P. Dutta, K. O. Smith, and R. W. Dibble (2000). "Status of Catalytic Combustion R&D for the Development of Energy Advanced Turbine Systems Program", *Journal of Engineering for Gas Turbines and Power*, 122, pp. 293-300.

Forzatti, P. and G. Groppi (1999). "Catalytic Combustion for the Production of Energy", *Catalysis Today*, 54, pp. 165-180.

Gates, S. (2000). "Industrial Advanced Turbine Systems Program Overview", Presentation at the Advanced Turbine Systems Program Review, Alexandria Vg, December 4-6.

Groppi, G., M. Belleto, C. Cristiani, P., Forzatti, and P. L. Villa (1993). Preparation and Characterization of Hexaaluminate-based Materials for Catalytic Combustion", *Applied Catalysis A: General*, 104, pp. 101-108.

Groppi, G., C. Cristiani and P. Forzatti (2001). "Preparation, Characterization, and Catalytic Activity of Pure and Substituted La-Hexaaluminate Systems for High Temperature Catalytic Combustion", *Applied Catalysis B: Environmental*, 35, pp.137-148.

Harlan, C. J. A. Kareiva, D. B. MacQueen, R. Cook, and A. R. Barron (1997). "Yttrium Doped Alumoxanes: A Chemie Douce Route to $Y_3Al_5O_{12}$ (YAG) and $Y_4Al_2O_9$ (YAM).", *Adv. Mater.* 9(1), 68.

Hjalmarsson, A. K. (1990). "Control of Nitrogen Oxide Emissions from Coal Combustion", *International Journal of Energy Research*, 14, pp. 813-82.

Jang, B. W., R. M. Nelson, J. J. Spivey, M. Ocal, R. Oukaci, and G. Marcelin (1999). "Catalytic Oxidation of Methane over Hexaaluminate and Hexaaluminate-supported Pd Catalysts", *Catalysis Today*, 47, 103-113.

Kareiva, A., C. J. Harlan, D. B. MacQueen, R. L. Cook, and A. R. Barron (1996). "Carboxylate-Substituted Alumoxanes as Processable Precursors to Transition Metal-Aluminum and Lanthanide-Aluminum Mixed-Metal Oxides: Atomic Scale Mixing Via a New Transmetallation Reaction", *Chemistry of Materials*, 8(9), 2331.

Kareiva, A., C. Bai, C. J. Harlan, D. B. MacQueen, A. R. Barron and R. L. Cook (2001). "Metal-Exchanged Carboxylato-Alumoxanes and Process of Making Metal-Doped Alumina", U.S. Pat. No. 6,207,130 B1.

Kikuchi, R., K. Takeda, K. Sekizawa, K. Sasaki, K. Eguchi (2001). "Thick-Film Coating of Hexaaluminate Catalyst on Ceramic Substrates and its Catalytic Activity for High-Temperature Methane Combustion", *Applied Catalysis A; General*, 218, pp. 101-111.

Macri, G. M. (2000). ). "ATS Technology Integration at Rolls-Royce", Presentation at the Advanced Turbine Systems Program Review, Alexandria Vg, December 4-6.

McCarty, J., M. Gusman, D. Lowe, D. Hildenbrand, and K. Lau (1999). "Stability of Supported Metal and Supported Metal Oxide Combustion Catalysts", *Catalysis Today*, 47, pp. 5-17.

Schlegel, A., S. Buser, P. Benz, H. Bockhorn, and F. Mauss (1994). "$NO_X$ Formation in Lean Premixed Noncatalytic and Catalytically Stabilized Combustion of Propane", 25th Symposium on Combustion/The Combustion Institute, pp. 1019-1026.

Spivey, J., W. L. Ben, R, M Nelson, G.. W. Marcelin, M., Ocal and R. Oukaci (1994). "Synthesis and Characterization of Sr1–xLaxMnAl11O19–a Hexaaluminates for the Catalytic Combustion of Methane", Symposium on Environmental Catalysis/Stationary Sources.

Suh, J. K., B. Ha, S. Jeong, J Koh, and J. Lee (1995). "Characterization of Transition Metal Impregnated La-Al Complex Oxides for Catalytic Combustion", *Microporous Materials*, 3, pp. 657-664.

Touchton, G. (1996). "Gas Turbines: Leading Technology for Competitive Markets," *Global Gas Turbine News*, 36(1), pp. 10-14.

Wachowski, L., P. Kirszensztejn, P. Lopatka, and B. Czajka (1994). "Studies of Physiochemical and Surface Properties of Alumina Modified with Rare-Earth Oxides. I. Preparation, Structure and Thermal Stability", *Materials Chemistry and Physics*, 37, pp. 29-38.

Woo, S., S. Kang, and J. Sohn (1998). "Effect of Water Content in the Precursor Solution on the Catalytic Property and Stability of $Sr_{0.8}La_{0.2}MnAl_{11}O_{19}$ High Temperature Combustion Catalyst", *Applied Catalysis B. Environmental*, 18, pp. 317-324.

Ying, J. Y. and A. Zarur (2002). "Synthesis of Nanometer Sized Particles by Reverse Micelle Mediated Techniques", U.S. Pat. No. 6,413,489 B1.

Zarur, A. and J. Y. Ying, (2000). "Reverse Microemulsion Synthesis of Nanostructured Complex Oxides for Catalytic Combustion, *Nature*, 403, pp. 65-67.

We claim:

1. An oxidation catalyst which comprises a metal exchanged hexaaluminate, prepared by metal exchange of an alumoxane precursor, having the formula:

$$Sr_XPd_{1-X}Al_{11}O_{18-\alpha}$$

where X ranges from greater than 0 to less than 1 and α is a number which makes the composition charge neutral.

2. The oxidation catalyst of claim 1 wherein the Pd concentration in the hexaaluminate is 2 wt % or less.

3. The oxidation catalyst of claim 1 wherein the Pd concentration in the hexaaluminate is 0.5, 1.0 or 2.0 wt %.

4. The oxidation catalyst of claim 1 wherein the metal exchanged alumoxane formed by metal exchange of the alumoxane precursor is heated to a temperature between 1000° C. and 1500° C. to form the metal exchanged hexaaluminate.

5. The oxidation catalyst of claim 1 wherein the metal exchanged alumoxane formed by metal exchange of the alumoxane precursor is heated to a temperature between 1300° C. and 1400° C. to form the metal exchanged hexaaluminate.

6. An oxidation catalyst which comprises a metal exchanged hexaaluminate, substituted with three metals, La, Sr and Mn, and prepared by metal exchange of an alumoxane precursor, having the formula:

$$La_XSr_YMn_ZAl_{11}O_{18-\alpha}$$

where $0.5 \geq X+Y+Z \geq 2.0$, each of X, Y and Z is greater than zero and Z is 0.2, 0.4, 0.6 or 0.8 and α is a number which renders the composition charge neutral.

7. The oxidation catalyst of claim 6 wherein the metal exchanged alumoxane formed by metal exchange of the alumoxane precursor is heated to a temperature between 1000° C. and 1500° C. to form the metal exchanged hexaaluminate.

8. The oxidation catalyst of claim 6 wherein the metal exchanged alumoxane formed by metal exchange of the alumoxane precursor is heated to a temperature between 1300° C. and 1400° C. to form the metal exchanged hexaaluminate.

9. The oxidation catalyst of claim 6 wherein Z is 0.2 or 0.4.

10. The oxidation catalyst of claim 6 wherein Z is 0.4.

11. The oxidation catalyst of claim 10 wherein the ratio X/Y ranges from 0.5 to 1.5.

12. The oxidation catalyst of claim 10 wherein the ratio X/Y ranges from 0.5 to 1.1.

13. The oxidation catalyst of claim 6 wherein the ratio X/Y ranges from 0.5 to 1.5.

14. The oxidation catalyst of claim 6 wherein the ratio X/Y ranges from 0.5 to 1.1.

15. The oxidation catalyst of claim 6 wherein Z is 0.4 and X/Y is 0.5, 0.6, 0.8, 1.0 or 1.1.

16. The oxidation catalyst of claim 6 wherein Z is 0.4 and X/Y is 1.0.

17. The oxidation catalyst of claim 6 wherein X+Y is equal to 1–Z.

18. The oxidation catalyst of claim 17 wherein Z is 0.4.

19. The oxidation catalyst of claim 18 wherein the ratio X/Y ranges from 0.5 to 1.5.

* * * * *